United States Patent Office 3,745,100
Patented July 10, 1973

3,745,100
METHOD OF PREPARING SEMIPOROUS FILM OF ALUMINUM OXIDE VOLTAGE ANODIZATION
Howard G. Lasser, Springfield, Va., assignor to the United States of America as represented by the Secretary of the Army
Filed Dec. 22, 1971, Ser. No. 210,909
Int. Cl. B01k 3/00; C23b 5/68, 9/02
U.S. Cl. 204—58                                    4 Claims

ABSTRACT OF THE DISCLOSURE

A method of producing a thick film of semiporous aluminum oxide on a sheet of aluminum. Pores are formed by a high voltage anodizing method that includes cooling a low concentrate oxalic acid electrolyte to a temperature of slightly above 0° centigrade and discharging this cooled electrolyte at a high flow rate on the geometric center of the aluminum sheet being anodized. Anodic voltages are initially 150 direct current (D.C.) volts and are increased in 20 volt increments for the first 5 to 10 minutes to the desired voltage for a two hour period with the electrolyte being circulated and cooled at such a rate that its temperature is about 8° centigrade at the end of the two hour period.

---

The invention described herein may be manufacture and used by or for the Government of the United States of America for governmental purposes without the payment to we of any royalties thereon.

BACKGROUND OF THE INVENTION

Aluminum is coated with an aluminum oxide film when anodized electrochemically. Characteristics and growth rates of these aluminum oxide films depend on the anodizing voltage, the current density and current transport properties, the type and concentration of the electrolyte used, and the operating temperature of the electrolyte. The film produced is continuous when the oxide formed is not soluble or has negligible solubility in the electrolyte. The thickness of the continuous film formed is found to be about 14 angstroms per anodizing volt in aqueous electrolytes in which the oxide solubility is negligible. When using higher anodizing voltages the electrolyte must be cooled to limit the temperature in the oxidation zone to avoid hot spots, and resulting burning of the substrate.

Oxide film characteristics change when the oxide being formed is partly or completely soluble in the electrolyte. In an extreme case, when a very solubilizing electrolyte is used in the anodizing bath, all of the oxide formed will be dissolved. Such a process is used for electrobrightning of metals. When an electrolyte having a limited solubility of aluminum oxide is used to anodize aluminum, a continuous film of aluminum oxide, called a barrier layer, is first formed. During growth of the oxide film the electrical resistance is increased at the anode and, therefore, the temperature of the electrolyte is increased, thus causing dissolution of some of the oxide. The dissolution of some of the oxide helps to maintain the current flow that provides additional oxide formation. The result of this process is the formation of a continued porous aluminum oxide film on the barrier layer. These porous cells are formed perpendicular to the barrier layer. It has been determined that pore size is a function of the electrolyte used, and is dependent on the forming or anodizing voltage. Cell walls and barrier layer thickness are primarily a function of the anodizing voltage, but are affected to a minor degree by the type of electrolyte used. Prior anodizing voltages were generally from 10 to 130 volts and the time of anodization somewhere between 19 seconds and 36–60 minutes. Sulfuric acid or a combination of sulfuric acid with other acids, such as chromic or oxalic, have been used as a solute in the electrolyte. Typical aluminum oxide cell sizes varied indirectly with the anodizing voltage with the average cell size being 27.2 angstroms per anodizing volt. The pore diameters were from 570 to 820 angstroms. The method of the present invention produces a much thicker aluminum oxide film.

SUMMARY OF THE INVENTION

This invention is a method of preparing thick fiilm oxide coatings on a sheet of aluminum. The electrolyte used in anodizing the film on the aluminum sheet is from 2% to 0.75% oxalic acid concentration. The electrolyte is circulated through electrolyte tubing in contact with cooling bath of ethylene glycol. The ethylene glycol is cooled by liquid nitrogen circulated through copper tubing in contact with the ethylene glycol. The electrolyte, circulated by a centrifugal pump, is discharged against the geometric center of the aluminum sheet being anodized. The initial voltage applied is 150 volts and is increased in 20 volt increments for the first 5 to 10 minutes to the desired voltage until two hours have elapsed. The electrolyte is circulated at the rate of 600 gallons per hour so that temperature of the electrolyte is kept at a rather constant cool temperature. The electrolyte is about 1° centigrade at the start of the process and is only about 8° centigrade at the end of the two hour period. A semiporous aluminum oxide film of 15–30 mils in thickness is formed on a 20 mil thick aluminum sheet at the end of the two hour period.

DESCRIPTION OF THE PREFERRED EMBODIMENT

Figure 1:
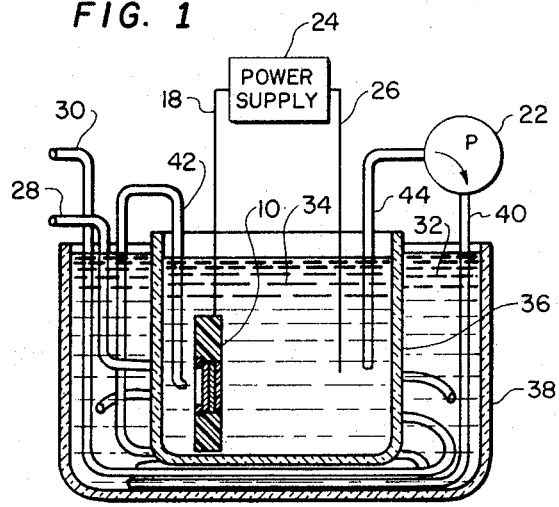
FIG. 1 is a schematic illustration of the apparatus used in the anodization method.
Figure 2:
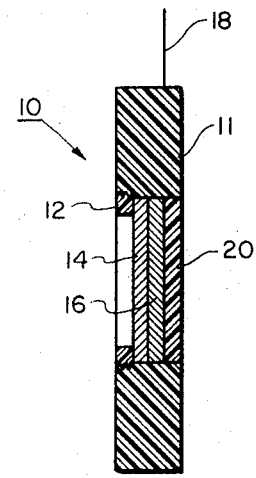
FIG. 2 illustrates the anode assembly that holds the aluminum sheet while the sheet is being anodized.
Figure 3:
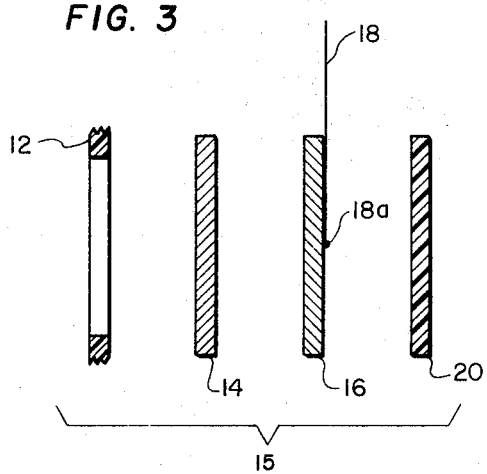
FIG. 3 illustrates an exploded enlarged view of the elements of the anode assembly of FIG. 2.

This invention is in a process of fabricating self-supporting aluminum oxide structures at anodizing voltages between 150 volts and 500 volts. A cooling technique is used to hold the temperature of the anode throughout the anodizing process to just slightly above 0° centigrade. The aluminum sheet to be anodized is a commercially available rolled sheet that is 99% pure and is 20 mils in thickness. Two inch diameter discs were cut from the aluminum sheet for anodizing in the present process. FIG. 1 shows the anode assembly 10 as it is positioned in an eelctrolyte bath 34. FIG. 2 is an illustration of the anode assembly 10 prior to being placed in the electrolyte bath 34. FIG. 3 illustrates the elements of the anode assembly 10 in an enlarged exploded view in the respective positions the elements occupy in the assembly.

The two inch diameter aluminum disc 14 has a first side positioned against one side of a tantalum backup plate 16. A tantalum lead 18 is spot welded to the other side of tantalum plate 16 at point 18a. A porous disc 20, made of tetrafluoroethylene, is positioned against the back of plate 16 with lead wire 18 feeding out the assembly 10 as shown in FIG. 2, and is attached to the positive side of power supply 24. A screw down holding ring 12 holds aluminum sheet 14, tantalum plate 16 and porous disc 20 within tetrafluoroethylene holder 11 by threading therein. Only a second side of aluminum sheet 14 is exposed to the electrolyte with the first side fitting tightly against the tantalum plate 16, with the tantalum plate preventing oxidation of the first side. The tantalum backup plate 16 usually lasts through four processes or 8 hours before it has to be replaced due to oxidation.

Prior to beginning the process and after the anode assembly 10 is assembled and secured, the exposed second side of the aluminum sheet 14 is cleaned with acetone and water. The acetone is first applied by squirting on the exposed side of the aluminum. Water is then squirted on the aluminum to wash the acetone off. The cycle is repeated until there is no water breaks (or beads as it is generally known) on the aluminum sheet. Previous cleaning processes used a caustic etch, such as 10% sodium hydroxide with a sodium carbonate or alkali carbonate inhibitor, followed by water rinse, neutralizing acid dip of sulfuric acid or the like, and then repeated rinses with neutralizing acid and water. This caused pitting of the aluminum sheet. The acetone and water rinses used in the present process proved successful against pitting of the aluminum.

The equipment used in the process include an outer container 38 that is fitted into a polystyrene container (not shown) with only the top exposed. Outer container 38 holds all of the equipment used in the anodizing process. A liquid nitrogen coil is wound four turns around beaker 36, and has an input tube 28 and an output tube 30. Electrolyte tubing 40 is wound on the bottom of the outer continr 38 and beaker 36 is set directly thereon. Beaker 36 is 4 liters in capacity. Outer container 38 is of 3 gallons capacity. One end 42 of the electrolyte tubing is passed over the side of beaker 36 and is turned at its very end to face the geometric center of the exposed surface of aluminum sheet 14 held by anode assembly 10. The other end of the electrolyte tubing 40 is connected to the outlet of electrolyte pump 22. An inlet pipe 44 to pump 22 is placed in beaker 36 on a side generally opposite to end 42 of the electrolyte tubing. After the electrolyte tubing and the liquid nitrogen tubing are wound, respectively, on the bottom of outer container 38 and around beaker 36, the outer container is then filled with ethylene glycol until the four turns of the liquid nitrogen coil are completely submerged in ethylene glycol. A fifth turn of the liquid nitrogen coil is passed out of the ethylene glycol bath and through the polystyrene container for diffusion in the open air. Liquid nitrogen is then circulated through the 4 turns of the liquid nitrogen coil by a manually operated valve in the feed line. The electrolyte is pumped by pump 22. The liquid nitrogen is completely vaporized by the time it has circulated out the last turn, i.e., the turn within the polystyrene container, and into the open air. Electrolyte tubing 40 is made of inert plastic tubing of ⅜ inch inside diameter. About 50 to 60 feet of this electrolyte tubing is totally submerged in the cooled ethylene glycol to provide sufficient electrolyte cooling. The liquid nitrogen tubing is made of copper and is ⅜ inch inside diameter. The length of the liquid nitrogen tubing that is totally submerged in the ethylene glycol is from 4 to 4½ feet. The electrolyte pump 22 used successfully with this process is a centrifugal stainless steel pump that circulate the electrolyte at a continuous rate of 600 gallons per hour. The solute of electrolyte used in various runs of this process is from 2% to 0.75% oxalic acid concentration.

Referring to FIG. 1, the anode assembly 10 is connected to the positive side of power supply and is then positioned in electrolyte bath 34 within beaker 36. An auxiliary lead electrode 26 that is attached to the negative side of power supply 24 is also positioned in electrolyte bath 34. Anode assembly 10 is positioned such that the exposed side of the aluminum sheet 14 is adjacent the end 42 of the electrolyte tubing for discharging the electrolyte onto the geometric center of the exposed aluminum. Pump 22 sucks the electrolyte out of bath 34 through pipe 44 at the same rate that the electrolyte is being discharged therein through pipe 42 forming a closed circulating system. At the start of the process the temperature of the electrolyte discharged from pipe 42 onto aluminum sheet 14 is about 1° centigrade. The electrolyte acts as a coolant to the anodizing layer thus allowing a higher current to pass through the anode assembly 10. The cooling of anodizing layer becomes more important as the semiporous layer is grown larger and larger, thus causing increased resistance to current flow with an additional increase in temperature. The temperature could become high enough to burn aluminum sheet 14. The liquid nitrogen feed rate is controlled by a quarter inch manual valve (not shown) in input tube 28. A 50 liter tank (not shown) of liquid nitrogen is used in the process.

In operation, the electrolyte is pumped by pump 22 through tubing 40 which is totally submerged in the ethylene glycol cooling bath of outer container 38. The electrolyte that is pumped through the electrolyte tubing is cooled to about 1° centigrade at the outlet of tube 42. Anode assembly 10 with tantalum lead 18 and auxiliary electrode 26 are placed in the electrolyte bath 34 such that the electrolyte discharged out tube 42 flows against the geometrical center of the second side of aluminum sheet 14. Circulation of the electrolyte is maintained at the high flow rate of 600 gallons per hour to prevent freezing of the electrolyte and to maintain the aluminum at a temperaturue sufficient to maintain anodizing of the anode at the subsequent higher voltages. A sufficient level of electrolyte is maintained in the electrolyte bath 34 within beaker 36, and is continuously circulated therethrough by pump 22. A diluted oxalic acid solution is selected as the electrolyte because anion impurities left in the oxide film can be burned off later. The percentage of oxalic acid is determined according to the specific need. Results are shown hereinbelow in relating the oxalic acid concentration to the temperature generated in the electrolyte. The process was run and results checked for oxalic acid concentrations between 2% by weight and 0.75% by weight.

The power supply used in the process consisted of various arrangements of solid state batteries. For example, three batteries were connected in series. One was 150 volts and two were 200 volts. The process started with the 150 volt battery being connected between the auxiliary lead electrode 26 and lead 18. Increments of voltages of 20 volts were added every 5 to 10 minutes, according to what power the aluminum sheet would take. Voltages are manually regulated by switching of the batteries across the leads and by voltage taps at the outputs of each of the batteries. The process is generally limited to 2 hours because of burning of the aluminum surface. The temperature of the circulating 0.75% oxalic acid concentration electrolyte at the outlet of tube 42 was at ¼° centigrade when the process was begun. At the end of 2 hours of increasing the applied voltage from 150 volts to 500 volts the temperature of the 0.75% oxalic acid concentration electrolyte was only 8° centigrade. This clearly showed that the 0.75% oxalic acid had low resistance. Total resistance to current flow is the resistance in lead 18, electrode 26, the tantalum plate 16, the aluminum layer, the aluminum oxide layer and the resistance of the electrolyte itself. Resistance within the electrolyte is very important as it is inversely proportional to the concentrate of oxalic acid in the electrolyte. The higher the anodizing voltage the larger the following will be: the cell size, the pore diameter and the barrier layer. Table I shows the increased cell and pore sizes corresponding to increased anodizing voltage levels reached in the process. For producing thick semiporous films of 15 to 30 mils in thickness onto aluminum sheet 14 originally 20 mils thick, the 0.75% concentration oxalic acid was used. This particular concentration of oxalic acid was used since this concentration has a small resistance.

The temperature of the electrolyte at the output of tube end 42 is first set at ¼° centigrade before anode assembly 10 is lowered therein for starting the anodizing process. There is no need for additional agitation of the electrolyte in bath 34 since the high flow rate of the electrolyte on aluminum sheet 14 provides the necessary agitation. Temperature of the electrolyte is monitored by a thermometer in the anodizing chamber. If either the temperature or the voltage got too high there was arcing across the aluminum oxide layer. The important thing to consider is the watts power used in the process. For example, the voltage is controlled during the first 10 minutes at 150 volts with the amperage being within tolerance since the highly resistant semiporous layer has only begun to form, and thus little power is consumed. After this initial 10 minutes, however, the amperage is controlled very closely. Power supply 24 has an amperage regulator for limiting the current, and thus the wattage consumed by the anodizing method. The top of beaker 36 and outer container 38 are open to the environment in which the process is being performed.

At the start of the process, the maximum current reached was 2 amps. The current level dropped very quickly to 0.5 amps, generally within 5 minutes of the initial 10 minute period. Anodizing was continued with constant voltage increment for short times as noted above, but current was regulated very closely during this time to avoid burning of the substrate. At the end of the two hour period of anodizing the anodized aluminum sheet was removed from assembly 10, cleaned in distilled water, and then air dried.

Four processes were run with their voltage and percentage oxalic acid concentrations with the resulting geometrical parameters of typical aluminum oxide structures formed by the above discussed techniques shown in Table 1. The physical data of the porous oxide film produced were measured by electron micrographs. The temperature of the electrolyte in all four of the processes rose to 8° centigrade during the last thirty minutes of the 2 hours of anodization. This temperature was tolerable, but any rise above this temperature generally resulted in burning of the films.

The most significant find in this method was that for the first time, porous aluminum oxide structures were formed at voltages of from 300 to 500 volts. The changes that made this feasible are, (1) the use of liquid nitrogen in the ethylene glycol cooling bath, (2) the high electrolyte circulation rate through the cooling bath, (3) discharge of the cold electrolyte directly on the anodizing surface of the aluminum sheet, and (4) control of the conductivity of the electrolyte by low solute concentrations. It should be noted that the semiporous aluminum oxide layers can be made porous by preferential removal of the barrier layer.

TABLE I

| Anodizing voltage (V) | Process data of— | | Physical data of the porous oxide film at— | | |
|---|---|---|---|---|---|
| | Percent oxalic acid (wt.) | Temperature of electrolyte (° C.) | Cell size (A.) | Pore size (A.) | Cell size (A.V) |
| 150 | 1.5 | 4±2 | 4,170 | 910 | 27.9 |
| 300 | 1.5 | 2±1 | 8,650 | | 28.8 |
| 450 | 1.0 | 0±1 | 11,400 | | 25.3 |
| 500 | 0.75 | 0±1 | 12,222 | 1,790 | 24.4 |

It should be understood, of course, that the foregoing disclosure relates to only a preferred embodiment of the invention and that numerous modifications or alterations may be mode therein without departing from the spirit and scope of the invention.

I claim:
1. A method of producing semiporous aluminum oxide films by high voltage anodization comprising the steps of:
   providing an anode assembly having an aluminum sheet therein that is covered on a first side by a tantalum backup plate and has a second side thereof exposed for anodization;
   cleaning said anode assembly;
   providing a sufficient amount of liquid electrolyte consisting of from 0.75 to 2.00% solution of oxalic acid in water and placing said electrolyte in a beaker of 4 liters capacity;
   placing said beaker in the geometric center of an outer container of 3 gallons capacity;
   cooling an ethylene glycol bath that is contained within said outer container by passing liquid nitrogen through copper tubing that is in contact with the ethylene glycol;
   pumping said electrolyte through said beaker and through electrolyte tubing that is immersed in the super cooled ethylene glycol bath whereby the electrolyte is maintained at about 1° centigrade or slightly above throughout the anodizing process;
   immersing said anode assembly in the electrolyte within the beaker whereby said exposed second side of the aluminum sheet faces the discharge end of said electrolyte tubing;
   applying the positive side of a power supply to said tantalum backup plate in electrical contact with said aluminum sheet and the negative side of said power supply to an auxiliary electrode in electrical contact with the electrolyte in said electrolyte bath container whereby voltages from said power supply are increased in controlled increments for short periods of time to cause current flow through the electrolyte, aluminum sheet, tantalum backup plate, power supply, and auxiliary electrode to produce thick films of semiporous aluminum oxide on the exposed side of said aluminum sheet.

2. The method of producing semiporous aluminum oxide films as set forth in claim 1 wherein said cleaning step includes alternately applying acetone and water until no water breaks are formed on the exposed side of said aluminum sheet.

3. The method of producing semiporous aluminum oxide films as set forth in claim 2 wherein the step of pumping said electrolyte is at the rate of 600 gallons per hour.

4. The method of producing semiporous aluminum oxide films as set forth in claim 3 wherein said step of applying the positive and negative sides of said power supply in controlled increments for short periods of time is initially at 150 volts for 10 minutes and is increased in increments of 20 volts every 5 to 10 minutes over a two hour total anodizing time until the final voltage is 500 volts.

References Cited

UNITED STATES PATENTS

| 3,296,114 | 1/1967 | Lloyd | 204—206 |
| 2,998,372 | 8/1961 | Wagner | 204—275 |
| 2,989,445 | 6/1961 | Lloyd et al. | 204—58 |

JOHN H. MACK, Primary Examiner
R. L. ANDREWS, Assistant Examiner

U.S. Cl. X.R.
204—275